United States Patent [19]
Dalbke

[11] Patent Number: 4,872,777
[45] Date of Patent: Oct. 10, 1989

[54] MEANS AND METHOD OF ERADICATING IMAGES FROM ELECTROSTATIC MEDIA

[75] Inventor: Gary R. Dalbke, Wooddale, Ill.

[73] Assignee: Teledyne Industries, Inc., Los Angeles, Calif.

[21] Appl. No.: 128,348

[22] Filed: Dec. 3, 1987

[51] Int. Cl.[4] ........................ B41J 27/12; C09D 9/00; B43L 19/00; B08B 7/00

[52] U.S. Cl. .................................... 401/199; 252/170; 134/40; 15/424

[58] Field of Search .................. 401/198, 199, 17, 18, 401/23; 252/170; 106/311; 134/35, 40; 15/424, 3.53

[56] References Cited

U.S. PATENT DOCUMENTS

| | | | |
|---|---|---|---|
| 4,052,327 | 10/1977 | Arena et al. | 252/170 X |
| 4,557,618 | 12/1985 | Iwata et al. | 401/18 X |
| 4,759,650 | 7/1988 | Granoff | 401/107 |

*Primary Examiner*—Alan W. Cannon
*Attorney, Agent, or Firm*—Lockwood, Alex, Fitzgibbon & Cummings

[57] ABSTRACT

Means and method for eradicating (i.e. removing) images affixed to copies of drawings or other documents made on electrostatic media by electrostatic copiers.

8 Claims, 1 Drawing Sheet

MEANS AND METHOD OF ERADICATING IMAGES FROM ELECTROSTATIC MEDIA

BACKGROUND AND SUMMARY OF THE INVENTION

This invention relates, generally, to means and method of eradicating (i.e. removing) images affixed to copies made on various media by electrostatic copiers such as those in widespread use under the brand names Xerox, Canon, Eastman, etc. More specifically, the invention relates to means comprising an image eradicator solution and a device for applying the same to remove images that have been affixed to various media in the electrostatic copying process sometimes referred to as Xerography.

A case in point can be the medium known as vellums.

Vellums, for example, are used in making translucent drawings and other documents requiring translucency. Various manufacturers have developed 100% rag content vellums with certain coatings applied that have allowed them to be used in electrostatic copiers. In the electrostatic copy process the photoreceptor drum receives an electrostatic charge. The charged drum is then exposed to the image to be copied and a latent electrical image is created. This latent image is developed by dusting it with so-called "toner" and the resulting image is transferred to the vellum. The toner is then affixed (i.e. bonded) to the vellum by heat to produce the desired final copy.

In the past, in the majority of instances, the type of vellum used with electrostatic copier machines has resulted in producing vellum copies with permanent type images. Practically speaking, such images are not readily removable or erasable. Hence, so-called erasable vellums have been made available on which corrections and revisions may more readily be made. However, the solvents and resins used in the manufacture of the erasable vellums tend to accumulate in the electrostatic copiers and have a detrimental affect on such equipment. Consequently, the market demand has been mostly for the permanent image type of vellums.

The object of this invention, generally stated, is a means for and method of eradicating or removing erasable and non-erasable images from permanent image copies produced on various media (e.g. vellums) in electrostatic copiers. The means comprises a device which contains or holds a quantity of acetone-water solution and provides a convenient means of applying the solution in required amounts to the images, or portions of images, to be removed or eradicated. The method part of the invention resides in the use of the acetone-water solution to remove or eradicate permanent images that have been affixed to various media in producing copies in electrostatic copier machines.

Certain other objectives and advantages of the invention will be apparent in view of the following detailed description of a working embodiment of the invention taken in connection with the accompanying drawings, wherein.

DETAILED DESCRIPTION

Figure 1:
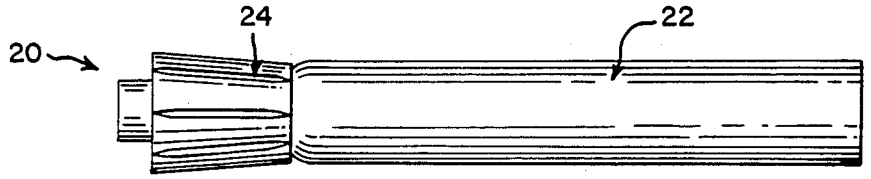
FIG. 1 is an elevational view of a device for storing and applying a image eradicator solution according to the present invention.
Figure 2:
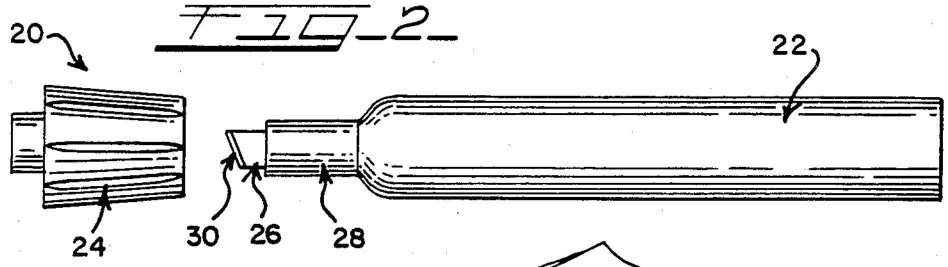
FIG. 2 is a view of the device shown in FIG. 1 with the cap removed.
Figure 3:
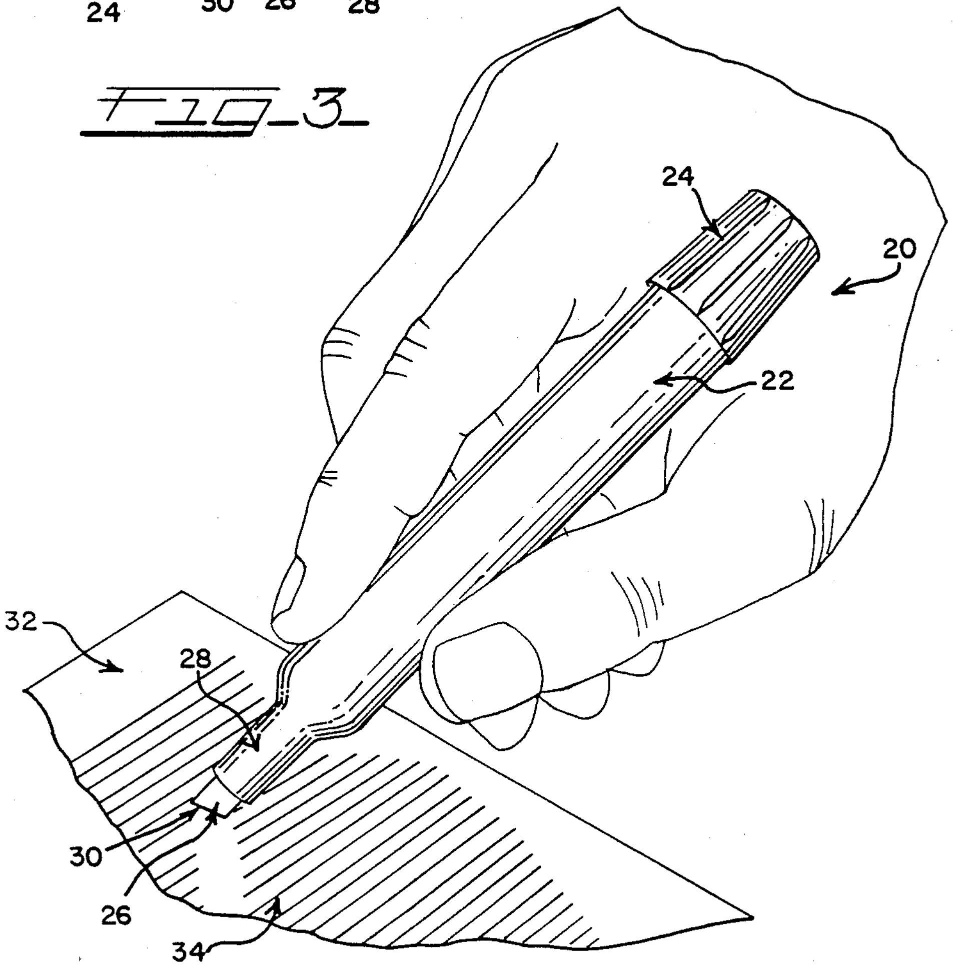
FIG. 3 is a perspective view illustrating the use of the device of FIGS. 1 and 2 in removing an electrostatic image from an electrostatic medium, such as vellum.

Referring to FIGS. 1 and 2, a device according to the present invention is illustrated as a barrel applicator 20. The applicator 20 is comprised of a tubular member 22 which serves as a container for a filling of image eradicator solution. The body 22 also provides a convenient and comfortable means by which a user can grasp the applicator 20 when applying the image eradicator solution (as illustrated in FIG. 3).

The body 22 is closed at one end and the opposite end has an integrally formed neck 28 having a rectangular opening for receiving and retaining with a tight fit, a felt-like tip member 26. In use, the tip member 26 provides a means for controlled releasing or dispensing of the image eradicator solution to the image to be removed or eradicated from the copy.

A cap member 24 is provided to protect the tip member 26 and prevent evaporation of the image eradicator solution when the applicator 20 is not in use. The cap member 24 covers tip member 26 by a friction fit with neck member 28. FIG. 1 is illustrative of the relationship between cap member 24 and body member 22 when said cap member 24 is frictionally secured to said neck member 28.

The cap 24 and barrel 22 are typically formed in known manner from a plastic material which is resistant to acetone. If desired, the barrel and cap can be formed of metal, e.g. aluminum. The felt-like tip member 26 is preferably made from polyester fibers which are oriented longitudinally and bonded together with resin so as to result in controlled capillarity (i.e. flow) and provide the desired hardness, durability and feel. The components of applicator 20 correspond generally to those utilized in such commercially available writing instruments or markers referred to as permanent and water-based markers.

Referring now to FIG. 3, illustration is made therein of the use of the barrel applicator 20. In use, the beveled edge 30 of tip member 26 is brought into contact with the electrostatic image (illustrated by lines 34) to be eradicated or removed totally or in part. By contacting the edge 30 with the image 34, the image eradicator solution flows through the tip member 26 and is controllably applied to the medium 32. Lateral motion or rubbing of the applicator 20 over the image 34 facilitates the application of the image eradicator solution while simultaneously removing the image 34 from the medium 32. It is believed that the image eradicator solution acts to soften or dissolve the binder components of the so-called "toner" which forms the image 34 upon contact therewith thereby allowing the image to be removed. The lateral motion or rubbing of said applicator 20 over the image 34 facilities removal of said image 34. As the components of an image are released from the medium they are sorbed into the felt-like tip member 26. In this manner, the medium is rendered substantially image-free where the image eradicator solution was applied.

With regard to the image eradicator solution, a blend of acetone and water has proven effective in removing images from vellums which were previously believed to be permanent. More specifically, a solution containing between about 85 to about 95 weight percent of acetone and between about 5 to about 15 weight percent of water is a very effective image eradicator solution. A solution formed of 93 parts by weight acetone and 7 parts by weight of water is preferred and has given optimum results in removing electrostatic images from vellum having 100% rag content.

It will be understood that certain other working embodiments of the invention will be apparent to those skilled in the art without departing from the spirit and scope of the invention as defined in the following claims.

What is claimed is:

1. A device for removing electrostatic images affixed to various mediums in an electrostatic copier, comprising:

a container;

a felt-like tip member secured to said container and communicating internally with the contents thereof; and, an image eradicator solution of acetone in water contained within said container to be dispensed therefrom through said tip member, said eradicator solution containing at least about 85% by weight of acetone.

2. The device of claim 1, wherein said image eradicator solution comprises from about 85 to 95% by weight of acetone and about 5 to 15% by weight of water.

3. The device of claim 1, wherein said image eradicator solution comprises about 93% by weight of acetone and about 7% by weight of water.

4. The device of claim 1, wherein said tip member is composed of fibers, for example, polyester.

5. A device for removing electrostatic images affixed to various mediums in an electrostatic copier, comprising:

a container;

a felt-like tip member secured to said container and communicating internally with the contents thereof; and an image eradicator solution consisting essentially of acetone in water contained within said container to be dispensed therefrom through said tip member.

6. The device of claim 5, wherein said image eradicator solution comprises from about 85 to about 95% by weight of acetone and about 5 to about 15% by weight of water.

7. The device of claim 5, wherein said image eradicator solution comprises about 93% by weight of acetone and about 7% by weight of water.

8. The device of claim 5, wherein said tip member is comprised of fibers, for example, polyester.

* * * * *